United States Patent [19]

Mitsumoto et al.

[11] 4,406,719
[45] Sep. 27, 1983

[54] PROCESS AND APPARATUS FOR PREPARING LAMINATED HEAT-SHRINKABLE STRIP WITH ELECTRIC CONDUCTOR WIRE EMBEDDED THEREIN

[75] Inventors: Takuo Mitsumoto; Yuzo Takahashi; Mamoru Miyamoto, all of Ichihara, Japan

[73] Assignee: Ube Industries, Ltd., Ube, Japan

[21] Appl. No.: 347,243

[22] Filed: Feb. 9, 1982

[30] Foreign Application Priority Data

Feb. 10, 1981 [JP] Japan .................................. 56-17505

[51] Int. Cl.³ ...................... H01B 13/06; B32B 31/08
[52] U.S. Cl. .................... 156/52; 100/93 P; 100/98 R; 100/138; 100/207; 156/85; 156/86; 156/269; 156/308.4; 156/312; 156/522; 156/583.5; 174/98; 174/DIG. 8; 219/528; 219/549; 428/292; 428/913
[58] Field of Search .................... 100/938, 98 R, 137, 100/138, 207; 156/52, 308.4, 312, 583.1, 583.5, 84, 85, 86, 269, 516, 522; 174/98, DIG. 8; 219/528, 549; 428/292, 913

[56] References Cited

U.S. PATENT DOCUMENTS

| | | | |
|---|---|---|---|
| 3,951,713 | 4/1976 | Emmel | 156/52 |
| 4,101,363 | 7/1978 | Lotto | 156/308.4 X |
| 4,330,351 | 5/1982 | LoMaglio | 156/308.4 X |

*Primary Examiner*—Robert A. Dawson
*Attorney, Agent, or Firm*—Finnegan, Henderson, Farabow, Garrett & Dunner

[57] ABSTRACT

There are provided improved process and apparatus for preparing a laminated heat-shrinkable strip comprising upper and lower heat-shrinkable sheets fused together with an electric conductor wire sandwiched therebetween as means for covering and protecting joints of steel pipes of oil pipelines or cables. The process comprises the steps of: subjecting successive sections of a starting strip with the sheets unfused, while said section are stationary, to a pressing operation, each operation consisting of simultaneously prehot-pressing a first length which is slightly longer than half a predetermined length, hot-pressing a second length which is adjacent to said first length and which is the same or longer than said predetermined length, and cold-pressing a third length which is adjacent to said second length and which is slightly longer than half said predetermined length, and; shifting forward said starting strip by an amount corresponding to half said predetermined length after completion of each said pressing operation and before the start of each next pressing operation. The apparatus comprises a prehot press, a main hot press and a cold press arranged in a series for carrying out the pressing operation and a conveyor system for the intermittent shifting operation wherein a pair of looped tetrafluoroethylene fluorocarbon polymer belts of a webbed pattern between which the starting strip is sandwiched, the strip being subjected to the pressures by the presses through the belts.

10 Claims, 6 Drawing Figures

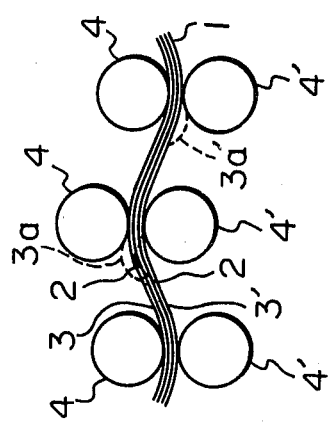
Fig. 1
Fig. 2
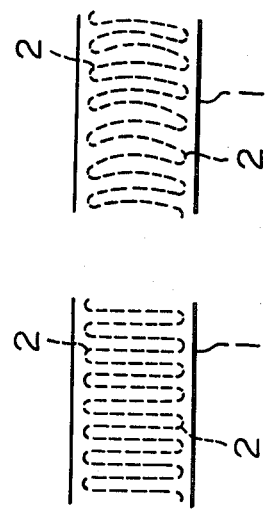
Fig. 3
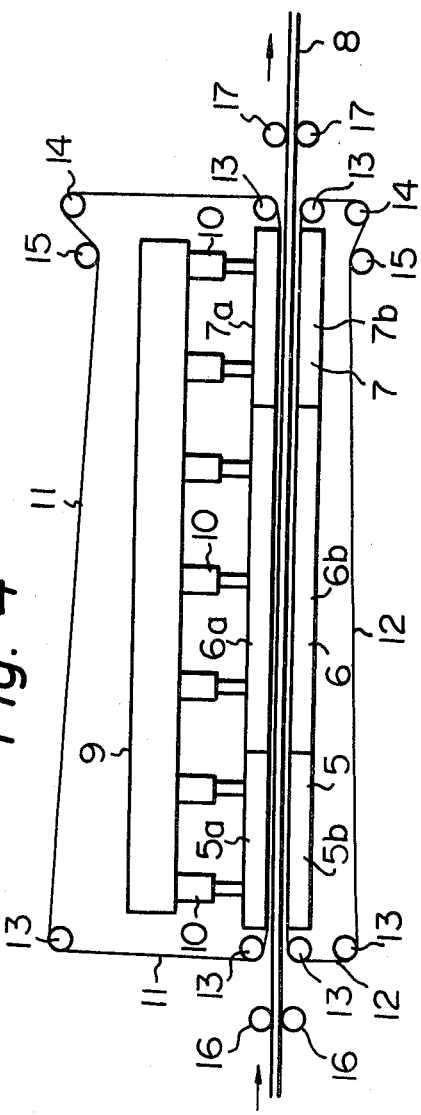
Fig. 4

PROCESS AND APPARATUS FOR PREPARING LAMINATED HEAT-SHRINKABLE STRIP WITH ELECTRIC CONDUCTOR WIRE EMBEDDED THEREIN

BACKGROUND OF THE INVENTION (1) Field of the Invention

The present invention relates to a process of and an apparatus for preparing a laminated strip conprising a pair of heat-shrinkable sheets fused together with a heating element, such as an electric conductor wire to which electricity is to be applied, therebetween.

(2) Description of the Prior Art

Such a laminated heat-shrinkable strip with wire embedded therein is well known as a means for covering and protecting joints of steel pipes of oil pipelines or cables. The strip is formed by fusing two heat-shrinkable sheets of, for example, polyethylene, placed one on top of the other with a wire of, for example, copper, therebetween. The sheets have the property of being thermally shrinkable in the length wise direction. The wire should not be aligned parallel to the shrinking direction but traversely thereto at an approximately right angle, thus has preferably been arranged in a zig-zag manner as shown in FIG. 1, in which numerals 1 and 2 denote the strip and the wire, respectively. The finished strip used as sealing means has a predetermined length and a pair of electric terminals to be connected to a power source. The terminals are on the two ends of the wire exposed from the strip at the opposite ends of the strip. The heat-shrinkable strip is used in the following manner. The strip is wound around a steel pipe or cable to cover the joint portion entirely. Electricity is then applied through the terminals of the wire embedded in the strip to heat the wire. The zig-zag arranged hot wire heats the entire strip to shrink it so that is is in a tight contact with the joint portion. This tight contact protects the joint from surface corrosion and improves sealing of the pipe at the joint. Such effects are ensured for a long period, even though they rely on the durability of the material forming the heat-shrinkable sheet.

In the conventional process, heat-shrinkable strips are prepared as shown in FIG. 3. Referring to FIG. 3, a pair of upper and lower sheets of polyethylene 3 and 3' and a copper wire sandwiched, in the zig-zag form shown in FIG. 1, therebetween are forced to pass through nibs of plural pairs of upper and lower heating or hot rolls 4 and 4'. These pairs of hot rolls 4 and 4' are positioned in a zig-zag arrangement as seen in cross-section, as shown in FIG. 3. The pair of the upper sheet 3 and lower sheet 3' are fused and press-fitted to each other while passing through each pair of rolls 4 and 4' by the pressures exerted by the rolls. Since the upper sheets 3 and the lower sheet 3', placed one on top of the other with uniformly zig-zag arranged wire 2 sandwiched therebetween, as shown in FIG. 1, are forced to run forward and up and down in a zig-zag manner while being pressed and fused by the rolls 4 and 4', the rolls are likely to cause the upper and lower sheets 3 and 3' to bulge from each other at portions 3a and 3'a, indicated by the lines dotted just before contact with the rolls. In so bulding, the press-fitted sheets become partially disengaged. When the bulged portions are passed though the rolls, the result is wrinkles. Further, repeated bulging allows undesirable entrance of air between the upper and lower sheets. Air in the laminated strip thermally expands and thus further enlarges the bulged portions while the strip is running through the series of rolls.

It is preferred that the copper wire 2 remain as originally arranged, that is, as shown in FIG. 1, when the laminated strip 1 is completed. However, since, according to the conventional process, the polyethylene sheets 3 and 3' with the wire 2 sandwiched therebetween are fused by means of a series of the hot rolls 4 and 4' while the sheets are forced to move forwardly continuously by the hot rolls, the uniformed zig-zag arrangement of the wire 2 between the sheets tends to be distorted as shown in FIG. 2. In the distorted arrangement, the gap between the neighboring portions of the wire 2 varies, resulting in a nonuniform density of the wire per unit area of the strip. Such a nonuniform distribution of wire density leads to nonuniform heating of the strip over the entire surface area thereof when electricity is applied to the wire. That is, heat energy generated per unit area by the wire varies at different areas of the strip. This results in a different amount of heat-shrinkage at different areas of the strip. In such a case, the strip does not completely cover the surface of the joint of the steel pipe or cable, that is, gaps appear between the strip and the pipe or cable surface, thereby not achieving or ensuring complete protection of the joint against corrosion.

SUMMARY OF THE INVENTION

It is, therefore, a primary object of the present invention to provide a process for effectively preparing a heat-shrinkable strip with an electric conductor wire embedded therein in which the above mentioned defects in the prior art are eliminated.

A second object of the present invention is to provide an apparatus for carrying out the process of the present invention.

Other objects and advantages of the present invention will be apparent from the following description.

In accordance with the present invention, there is provided a process for preparing a laminated heat-shrinkable strip comprising upper and lower heat-shrinkable sheets fused together with an electric conductor wire sandwiched therebetween, comprising the steps of: preparing a continuous starting strip comprised of unfused sheets placed one on top of the other with an electric conductor therebetween; subjecting successive sections of said starting strip, while said sections are stationary, to a pressing operation, each operation consisting of simultaneously prehot-pressing a first length which is slightly longer than half a predetermined length, hot-pressing a second length which is adjacent to said first length and which is the same or longer than said predetermined length, and cold-pressing a third length which is adjacent to said second length and which is slightly longer than half said predetermined length; shifting forward said starting strip by an amount corresponding to half said predetermined length after completion of each said pressing operation and before the start of each next pressing operation; and cutting the resultant strip into the predetermined length to form individual strip products of the predetermined lengths. The third length may be the same as the first length.

A further process may be added comprising a step of prehot-pressing a fourth length of said starting strip at the very first pressing operation, said fourth length being at the very front of said starting strip and corresponding to the difference between said first length and half said predetermined length.

Preferably, said starting strip is subjected to hunching pressure at one or a combination of any of the prehot-pressing, hot-pressing, and cold pressing. Further preferably, the sections of the starting strip to be subjected to the pressing operation are sandwiched between upper and lower belts and said forward shifting of said starting strip is effected by shifting forward both said belts simultaneously, said section of said starting strip being subjected to said prehot-pressing, hot-pressing, and cold-pressing through both said belts.

The belts are preferably made of tetrafluoroethylene fluorocarbon polymer resin and have a rough surface of a webbed pattern.

According to the present invention, there is also provided an apparatus for carrying out the above-mentioned process. The apparatus comprises a prehot press provided with upper and lower hot plates having the above-mentioned first length, the upper hot plate and lower hot plate being vertically movable relative to each other; a main hot press provided with upper and lower hot plates having the above-mentioned second length, the main hot press being adjacent to the prehot press and the upper hot plate and lower hot plate being vertically movable relative to each other concurrently with the vertical movement of the corresponding hot plate of the prehot press; a cold press provided with upper and lower cold plates having the above-mentioned third length, the cold press being adjacent to the main hot press and the upper cold plate and lower cold plate being vertically movable relative to each other concurrently with the vertical movement of the corresponding hot plates of the prehot press and main hot press; and a conveyor system for shifting forward the starting strip, composed of unfused sheets with an electric conductor wire therebetween, from the prehot press toward the cold press through a passage, having forward and rear ends and difined by the adjacent pairs of upper and lower plates, when the pairs of the plates are all in an open position; wherein the presses are adapted to actuate their respective plates in the opening position to press sections of the starting strip therebetween while the starting strip is stationary.

Preferably, the conveyer system comprises means for driving synchronously and intermittently upper and lower looped belts in such an arrangement that the lower section of the upper looped belt and the upper section of the lower looped belt are located in the passage over the length thereof, so that the starting strip is sandwiched between the sections of said belts and is shifted forward intermittently.

It is preferred that each of the belts is comprised of tetrafluoroethylene fluorocarbon polymer resin with glass fibers embedded therein.

Preferably the conveyor system further comprises first and second pairs of pinching rollers. The first pair of pinching rollers are positioned behind the rear end of the above-mentioned passage and the second pair of pinching rollers are positioned in front of the forward end of the passage, so that the starting strip is forced to pass through both pairs of pinching rollers.

The apparatus may preferably further comprise means for cutting off the resultant strip to form the strip products of the predetermined lengths. The cutting means is positioned in front of the second pair of pinching rollers.

BRIEF DESCRIPTION OF THE DRAWINGS

FIG. 1 is a plane view showing a heat-shrinkable strip wherein a wire of a zig-zag fashion is embedded;

FIG. 2 is a plane view showing a heat-shrinkable strip corresponding to that of FIG. 1, which was prepared by the apparatus shown in FIG. 3 below;

FIG. 3 is a diagrammatical sectional view showing a conventional apparatus for preparing such strip as shown in FIG. 1;

FIG. 4 is a diagrammatical sectional view corresponding to the FIG. 3, showing an apparatus of the present invention for preparing a heat-shrinkable strip as shown in FIG. 1;

DESCRIPTION OF THE PREFERRED EMBODIMENTS

Figure 5:
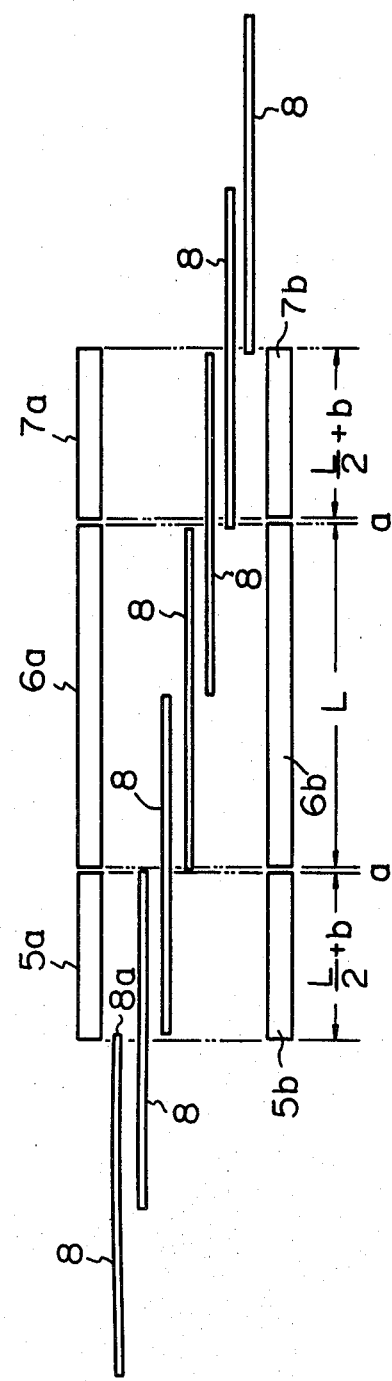
FIG. 5 is a diagrammatical plane view showing a process of preparing a heat-shrinkable strip as shown in FIG. 1 according to the present invention, particularly indicating a manner in which the strip, while being prepared, is shifted forward intermittently or step by step.

Referring to FIG. 4, an apparatus of the present invention comprises a prehot press 5 having an upper hot plate 5a and a lower hot plate 5b, a main hot press having an upper hot plate 6a and a lower hot plate 6b, and a cold press 7 having an upper cold plate 7a and a lower cold plate 7b. The prehot press 5, main hot press 6, and cold press 7 are arranged adjacent to each other along the forwarding direction of a strip 8. The strip 8, for example, consists of an upper polyethylene sheet and a lower polyethylene sheet and a copper wire of a zig-zag fashion sandwiched therebetween as shown in FIG. 1. The upper hot plate 5a of the prehot press 5, the upper hot plate 6a of the main hot press 6, and the cold plate 7a of the cold press 7 are mounted to be vertically movable. The hot plates 5a, 5b, 6a and 6b and the cold plates 7a and 7b have vertical and/or horizontal passages through which a heating medium such as steam and a cooling medium such as cold water are allowed to flow so that the hot plates are heated and the cold plates are cooled, respectively.

The apparatus further comprises a stationary plate 9 on which cylinder-piston units 10 are mounted. Two cylinder-piston units 10 are connected to each of the upper plates of the prehot press 5, the main hot press 6, and the cold press 7, to move concurrently the upper plates up and down relative to the lower plates. The cylinder-piston units 10 are designed to vary the pressures of the pistons as needed, while the upper plates press the strip 8 against the corresponding lower plates. In the above arrangement, the upper plates 5a, 6a, and 7a are moved so that their lower surfaces lie on a common horizontal plane. The lower plates 5b, 6b and 7b are stationary with their upper surfaces also lying on a common horizontal plane.

There are provided in the apparatus, two belt conveyors having a pair of upper and lower endless belts of tetrafluoroethylene fluorocarbon polymer 11 and 12. The upper belt 11 is rotated around the upper plates 5a, 6a and 7a and the stationary plate 9 by means of guiding rollers 13, a driving roller 14 connected to a motor (not shown) and a tensioning or snapping roller 15, while the lower belt 12 is rotated around the lower plates 5b, 6b and 7b by means of corresponding guiding rollers 13, a corresponding driving roller 14 connected to the motor and a corresponding snapping roller 15. These upper and lower endless belts 11 and 12 dcan be rotated when the upper and lower plates 5a, 5b, 6a, 6b, 7a and 7b are in an open position. The belts sandwich the strip 8 between them, thereby holding the strip. When the upper and lower plates are in the open position, the motor is operated to rotate the belts to shift forward the strip 8 from the prehot press side toward the cold press side for a predetermined distance. A plurality of small rollers (not shown) may also be provided near the hot plates 6a and 6b of the main hot press 6 for pressure on belts.

As the endless belts 11 and 13, it is preferable to use belts composed of tetrafluoroethylene fluorocarbon polymer with glass fibers embedded therein, prepared by a press molding method. Preferably, the belts have relatively rough surfaces of a webbed or aventurine pattern. The use of tetrafluoroethylene fluorocarbon polymer for the belts allows tight contact with the strip 8 at portions of the strip heated and pressed by the prehot press 5 and the main hot press 6, and extremely easy release from these strip portions after they are shifted to the zone of the cold press 7 and cooled. The provision of a rough surface of a webbed pattern to the tetrafluoroethylene fluorocarbon polymer belts effectively prevents heat shrinkage of the sheets and enables a high air-venting effect. The webbed pattern is imparted to the surface by the use of the glass fibers having a larger diameter than those used for tetrafluoroethylene fluorocarbon polymer belts having a smooth surface and by the use of a greater ratio of glass fibers to tetrafluoroethylene fluorocarbon polymer resin than that used for teflon belts having a smooth surface. Such a higher ratio further results in reduced heat-shrinkability of the belts themselves. Further, belts of tetrafluoroethylene fluorocarbon polymer are used rather than coating the hot plates with tetrafluoroethylene fluorocarbon polymer resin, because in the latter case the strip would be liable to adhere to the hot plates too strongly to be removed therefrom. The use of tetrafluoroethylene fluorocarbon polymer belts 11 and 12 in this embodiment therefore ensures easy opening of the upper hot plates 5a and 6a.

There are provided a pair of pinching rollers 16 at a position behind the pair of the belt 11 and 12, and another pair of pinching rollers 17 at a position in front of the pair of the belts 11 and 12. These pinching rollers 16 and 17 act to prevent the strip 8 from heat-shrinking and also to vent air from the strip 8. The dimensions of the hot and cold plates are determined, as follows, on the premise that the resultant fused laminated strip is cut into individnal products or units having a predetermined length: The hot plates 5a and 5b and cold plates 7a and 7b are designed to be slightly longer than half the predetermined product length, while the hot plates 6a and 6b are designed to be the same length as the predetermined product length.

Assuming that the length of the strip product is Lm, the length of the hot plates of the main hot press 6 is Lm, and the length of the hot plates of the prehot press 5 and the length of the cold plates of the cold press 7 are L/2 +b, wherein b is in the order of several dozen millimeters. The space between the hot plates 5a and 5b and the hot plates 6a and 6b and between the hot plates 6a and 6b and the cold plates 7a and 7b is appreximately 10 mm.

Referring to FIG. 5, the apparatus fuses the heat-shrinkable sheets sandwiching the copper wire together to form a laminated strip by repeated pressing operations, each consisting of several minutes pressing by hot plates 5a and 6a and cold plate 7a through actuation of cylinder-piston units 10 (FIG. 4), interspaced with forward shifting of the strip 8 through driving of endless belts 11 and 12 (FIG. 4).

At the initial pressing operation when strip 8 is first inserted into the apparatus, just a forward end portion 8a, of length b, is inserted inside the prehot press 5 to be prehot pressed. At subsequent pressing operations, the strip 8 is shifted forward by an amount corresponding to half the predetermined product length (Lm/2). The initial prehot pressing of just the forward end portion 8a results in sufficient fusion of the sheets at the forward and rear ends of each subsequent strip product.

Each roughly half predetermined product length section of the strip therefore undergoes four pressings from the time it enters the apparatus to the time it leaves it, as shown by the seven steps in FIG. 5, i.e., one prehot pressing, two hot pressings, and one cold pressing. It should be noted that while FIG. 5 shows product length sections of the strip 8, this is only for the convenience of explaining the process of the present invention and that the strip 8 is actually continuous.

The prehot press 5 mainly preheats and air vents. The main hot press 6 mainly fuses the upper and lower sheets of the strip 8 together to form a combined laminated strip. The cold press 7 cools the combined laminated strip.

The reason why prehot press 5 is provided independent from main hot press 6 is the different operational conditions, i.e., temperature, pressure, and pressing time, appropriate for prehot pressing and hot pressing. For example the temperature of the prehot press 5 is preferably less than the softening point of the sheets, in the case of polyethylene less than 100° C., while the temperature of the main hot press 6 is preferably that suitable for fusing the sheets, in the case of polyethylene about 200° C. The pressure and pressing time of the prehot press 5 are also preferably half those of the main hot press 6.

The reasons why the prehot press 5 is about half the length of the main hot press 6 are, first, that there is no need for the prehot press 5 to be as long as the main hot press 6 and, second, the half length is convenient for future expansion of the apparatus to increase productivity. In such a future expansion, one can install a new prehot press adjacent to the present prehot press 5 and use the present prehot press 5, by changing its operational conditions, as part of main hot press 6.

It is preferred that the length of the main hot plates 6a and 6b may be $L+L/2 \times X$, where L is the product length and X is 0, 1, 2 or 3.

In the above apparatus, the sheets of strip 8 are pressed and fused together while stationary and while on a common horizontal plane. This prevents heat-shrinking of the sheets of the strip 8 during pressing, distortion of the arrangement of the wire sandwiched therebetween, and entrance of air between the sheets. Further, the strip 8 is continuously, though intermittently shifted forward by an amount corresponding to half the predetermined product length between each pressing operation. This enables efficient pressing and fusing of a long strip 8 on a continuous, though intermittent basis, thereby enabling production of large amounts of strip products.

Figure 6:
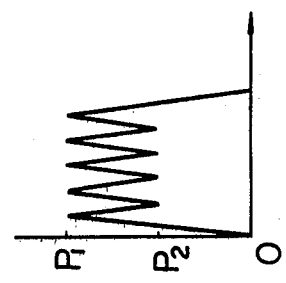
FIG. 6 is a diagram showing one example of a variation of pressure to time, a hot plate of a hot press shown in FIG. 4 being subjected to the pressure during the preparation of the strip, according to the present invention.

In the above apparatus, more effective renting is achieved by hunching the pressure exerted on strip 8 by hot plates 5a and 6a in the state where said hot plates are pressed down upon strip 8 through teflon belt 11 during the pressing of strip 8 by prehot press 5 and main hot press 6. The pressure is hunched as shown in the graph of FIG. 6, i.e., is alternated several times between a maximum $P_1$ and minimum $P_2$. The strip 8 is therefore alternately pressed down hard and released, thereby being fully vented.

The apparatus is designed to allow the maximum pressure $P_1$ and the minimum pressure $P_2$ to be changed appropriately according to the type of sheet material. The minimum pressure $P_2$ may be set to zero and may be controlled to increase gradually over time along with the rise in temperature of strip 8 until the maximum pressure $P_1$.

The single long continuous strip 8, which has been fused and cooled by being pressed and shifted from the prehot press 5, main hot press 6, and cold press 7, is finally cut into the predetermined lengths and at the predetermined cutting positions to form strip products when the strip 8 appears from out of cold press 7.

The present invention is not limited to the above embodiment. For example in the above embodiment, the apparatus is designed so that the upper plates 5a, 6a, and 7a move vertially. As other embodiments, the apparatus may be designed so that the lower plates 5b, 6b, and 7b move vertically or so that both the upper and lower plates 5a, 5b, 6a, 6b, 7a, and 7b move vertically. Further, in the above embodiment, prehot press 5 and main hot press 6 exert hunching pressure together. As other embodiments, prehot press 5 and main hot press 6 may exert hunching pressure separately; prehot press 5 may exert hunching pressure alone; prehot press 5, main hot press 6, and cold press 7 may exert hunching together; etc.

Accoridng to the present inveniton the following advantages are therefore achieved.

1. Use of a hot press apparatus enables, in the case of production of laminated heat-shrinkable strips sandwiching wire in a zig-zag fushion therebetween, the fusion of the component sheets while in a stationary position, thereby enabling fusion without sheet heat shrinkage, prevention of distortion of the copper wire arrangement, and fusion without the entrance of air, whereby reliable, easy production products of a considerably high quality can be achieved.

2. The arrangement of a prehot press, main hot press, and cold press adjacent to each other in a line, the design of the prehot press and cold press to be about half the length of the final strip product and the design of the main hot press to be the same length as the final strip product, and the forward shifting of the strip intermittently by amounts corresponding to half the length of the final strip product enable a relatively high speed of shifting of the strip and efficient pressing of a long, continuous strip, thereby enabling a good work efficiency and relatively high speed of manufacture and, therefore, production of a large amount of products.

3. The design allows for the addition of a new prehot press, etc., and combination of the old prehot press with the main hot press for a longer main hot press, thereby faciliating increased productivity.

4. Prehot pressing of just the forward end portion of the strip at the initial pressing operation and subsequent shifting forward by amounts corresponding to half the length of the strip product ensures sufficient fusion of the forward and rear end portions of each subsequent strip product.

5. Application of hunching pressure during pressing of sheets by hot plates leads to efficient air venting from strip.

6. Provision of rotatable tetrafluoroethylene fluorocarbon polymer belts between the hot and cold plates and the strip to be fused prevents adhesion of the sheets of the strip to those plates and facilitates release of the strip when the hot plates are opened. Provision of a rough surface with a webbed pattern to the tetrafluoroethylene fluorocarbon polymer belts effectively prevents heat shrinkage of the upper and lower sheets during heat or hot pressing and enhances the efficiency of air-venting from the sheets being fused.

7. Provision of pairs of pinching rollers in the apparatus so that the strip passes through one pair of the pinching rollers just before being sandwiched by the tetrafluoroethylene fluorocarbon polymer belts of the conveyors and passes through the other pair of the pinching rollers just after being released from the belts effectively prevents heat shrinkage of the upper and lower sheets and facilitates effective air-venting from the sheets.

We claim:

1. A process for preparing a laminated heat-shrinkable strip comprising upper and lower heat-shrinkable sheets fused together with an electric conductor wire sandwiched therebetween, comprising the steps of:
preparing a continuous starting strip comprised of unfused sheets placed one on top of the other with an electric conductor therebetween;
subjecting successive sections of said starting strip while said sections are stationary, to a pressing operation, each operation consisting of simultaneously prehot-pressing a first length which is slightly longer than half a predetermined length, hot-pressing a second length which is adjacent to said first length and which is the same as or longer than said predetermined length, and cold-pressing a third length which is adjacent to said second length and which is slightly longer than half said predetermined length;
shifting forward said starting strip by an amount corresponding to half said predetermined length after completion of each said pressing operation and before the start of each next pressing operation;
cutting the resultant strip into the predetermined length to form individual strip products of the predetermined lengths, wherein:
(1) upper and lower looped belts arranged so that the lower section of said upper looped belt and the upper section of said lower looped belt are located over said sections of said starting strip to be subjected to the pressing operation with said starting strip sandwiched between said sections of said belts and said belts are driven so as to be shifted forward intermittently with said starting strip; and
(2) a combination of said upper and lower belt sections and said starting strip sandwiched therebetween is subjected to said prehot-pressing, said hot-pressing and said cold-pressing.

2. A process as claimed in claim 1, further comprising a step of prehot-pressing a fourth length of said starting strip at the very first pressing operation, said fourth length being the very front of said starting strip and corresponding to the difference between said first length and half said predetermined length.

3. A process as claimed in claim 2, wherein said starting strip is subjected to hunching pressure at one or any combination of said prehot-pressing, said hot-pressing and cold-pressing.

4. A process as claimed in claim 3, wherein each of said said belts is comprised of tetrafluoroethylene fluorocarbon polymer resin with glass fibers embedded therein.

5. An apparatus for preparing a laminated heat-shrinkable strip comprising upper and lower heat-shrinkable sheets fused together with an electric conductor wire therebetween, comprising:

a prehot press provided with upper and lower hot plates having a first length slightly longer than half a predetermined length, said upper hot plate and lower hot plate being vertically movable relative to each other;

a main hot press provided with upper and lower hot plates having a second length the same as or longer than the predetermined length; said main hot press being adjacent to said prehot press and said upper hot plate and said lower hot plate being vertically movable relative to each other concurrently with the relative vertical movement of the upper hot plate and lower hot plate of said prehot press;

a cold press provided with upper and lower cold plates having a third length slightly larger than half the predetermined length, said cold press being adjacent to said main hot press and said upper cold plate and said lower cold plate being vertically movable relative to each other concurrently with the relative vertical movement of the upper hot plates and lower hot plates of said prehot press and main hot press;

a conveyor system for shifting forward the starting strip, composed of unfused sheets placed one on top of the other with an electric conductor wire therebetween, from said prehot press toward said cold press through a passage, having forward and rear ends and defined by the adjacent pairs of said upper and lower plates, when said pairs of said plates are all in an open position;

said conveyor system comprising means for driving synchronously and intermittently upper and lower looped belts in such an arrangement that the lower section of said upper looped belt and the upper section of said lower looped belt are located in said passage over the length thereof, so that said starting strip is sandwiched between said sections of said belts and is shifted forward intermittently; and wherein said presses are adapted to actuate their respective plates in said opening position to press the section of said starting strip therebetween while said starting strip is stationary.

6. An apparatus as claimed in claim 5, wherein each of said belts is comprised of tetrafluoroethylene fluorocarbon polymer resin with glass fibers embedded therein.

7. An apparatus as claimed in any one of claims 5 or 6, wherein said conveyor system further comprises first and second pairs of pinching rollers, said first pair being positioned behind the rear end of said passage and said second pair being positioned in front of the forward end of said passage, so that said starting strip is forced to pass through both said pairs of pinching rollers.

8. An apparatus as claimed in claim 7, further comprising means for cutting off said resultant strip to form said strip products of the predetermined lengths, said cutting means being positioned in front of said second pair of pinching rollers.

9. A process as claimed in claim 1, wherein said second length is $L + \frac{1}{2}L \times X$, where L is the predetermined length, and X is 0, 1, 2 or 3.

10. An apparatus as claimed in claim 5, wherein said second length is $L + L/2 \times X$, where L is the predetermined length and X=0, 1, 2 or 3.

* * * * *